(12) United States Patent
Makuta

(10) Patent No.: US 8,182,079 B2
(45) Date of Patent: May 22, 2012

(54) IMAGE FORMING METHOD AND IMAGE FORMING APPARATUS

(75) Inventor: Toshiyuki Makuta, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 544 days.

(21) Appl. No.: 12/410,078

(22) Filed: Mar. 24, 2009

(65) Prior Publication Data

US 2009/0244117 A1 Oct. 1, 2009

(30) Foreign Application Priority Data

Mar. 25, 2008 (JP) ................................. 2008-077724

(51) Int. Cl.
 *B41J 2/01* (2006.01)
(52) U.S. Cl. ............. 347/102; 347/100; 347/101; 347/6
(58) Field of Classification Search .................. 347/100, 347/101, 102
 See application file for complete search history.

(56) References Cited

U.S. PATENT DOCUMENTS

| | | | |
|---|---|---|---|
| 6,257,716 B1 | 7/2001 | Yanagawa et al. | |
| 6,824,262 B2 | 11/2004 | Kubota et al. | |
| 7,214,260 B2 * | 5/2007 | Doi et al. | 106/31.58 |
| 7,381,756 B2 * | 6/2008 | Kato et al. | 523/160 |
| 7,645,035 B2 | 1/2010 | Adachi et al. | |
| 2001/0038409 A1 | 11/2001 | Yanagawa et al. | |
| 2003/0116055 A1 | 6/2003 | Kubota et al. | |
| 2005/0012798 A1 | 1/2005 | Adachi et al. | |
| 2006/0057339 A1 | 3/2006 | Adachi et al. | |
| 2006/0203055 A1* | 9/2006 | Doi | 347/96 |
| 2007/0054981 A1 | 3/2007 | Yanagi et al. | |
| 2007/0197684 A1* | 8/2007 | Yamashita et al. | 523/160 |
| 2007/0296790 A1* | 12/2007 | Nakazawa et al. | 347/102 |
| 2008/0055385 A1 | 3/2008 | Houjou | |
| 2008/0071007 A1 | 3/2008 | Spinelli | |

FOREIGN PATENT DOCUMENTS

EP 0778321 A2 6/1997
(Continued)

OTHER PUBLICATIONS

Japanese Office Action issued in Japanese Patent Application No. 2008-077724 on Jan. 30, 2012 (with English translation).

*Primary Examiner* — Matthew Luu
*Assistant Examiner* — Henok Legesse
(74) *Attorney, Agent, or Firm* — Birch, Stewart, Kolasch & Birch, LLP.

(57) ABSTRACT

An image forming method includes the steps of: depositing an aggregating treatment liquid containing 10% or more and 90% or less of a water-soluble high-boiling-point organic solvent having an SP value of 30 or lower onto a recording medium; starting drying of the aggregating treatment liquid deposited on the recording medium within five seconds after the step of depositing the aggregating treatment liquid onto the recording medium; ejecting an ink containing 10% or more and 90% or less of a water-soluble high-boiling-point organic solvent having an SP value of 30 or lower in accordance with an image signal, so as to be superimposed on the aggregating treatment liquid deposited on the recording medium; and removing water contained in a solvent of the ink on the recording medium in such a manner that the water contained in the ink becomes 4 g/m$^2$ or less when converted to a deposition volume.

7 Claims, 11 Drawing Sheets

FOREIGN PATENT DOCUMENTS

| | | |
|---|---|---|
| EP | 1088865 A1 | 4/2001 |
| EP | 1132438 A2 | 9/2001 |
| JP | 11-188858 A | 7/1999 |
| JP | 2002166533 A | 6/2002 |
| JP | 2003166750 A | 6/2003 |
| JP | 2003266916 A | 9/2003 |
| JP | 2004-10633 A | 1/2004 |
| JP | 2004090596 A | 3/2004 |
| JP | 2004338361 A | 12/2004 |
| JP | 2005329606 A | 12/2006 |

* cited by examiner

Fig. 2

Table 1

| | Level 1 | Level 2 | Level 3 | Level 4 |
|---|---|---|---|---|
| Drying step | No | Yes | Yes | Yes |
| Total weight | 10.0 g/m$^2$ | 6.0 g/m$^2$ | 4.0 g/m$^2$ | 1.3 g/m$^2$ |
| Weight of water | 8.7 g/m$^2$ | 4.7 g/m$^2$ | 2.7 g/m$^2$ | 0.0 g/m$^2$ |
| Water content ratio | 87% | 78% | 67% | 0% |
| Fixing of coloring material | Poor (unsatisfactory) | Moderate (slight movement of dots) | Good (movement of dots, but not noticeable) | Very good |

Fig. 3

Table 2

| Level | System | Ink HBS | | | Treatment liquid HBS | | | Landing interference | Floating of coloring material | Image contraction | Dot white spot reproducibility | Curl | Remarks |
|---|---|---|---|---|---|---|---|---|---|---|---|---|---|
| | | HBS type | SP value | Additive amount | HBS type | SP value | Additive amount | | | | | | |
| 1 | Condition C | GP-250 | 26.4 | 15% | GP-250 | 26.4 | 15% | × | ○ | — | × | ○ | Comp. Ex. |
| 2 | Condition B | GP-250 | 26.4 | 15% | GP-250 | 26.4 | 15% | ○ | × | — | × | × | Comp. Ex. |
| 3 | Condition A | Glycerine | 40.97 | 15% | Glycerine | 40.97 | 15% | ○ | ○ | × | × | × | Comp. Ex. |
| 4 | Condition A | Glycerine | 40.97 | 15% | GP-250 | 26.4 | 15% | ○ | ○ | × | × | × | Comp. Ex. |
| 5 | Condition A | GP-250 | 26.4 | 15% | Glycerine | 40.97 | 15% | ○ | ○ | × | × | × | Comp. Ex. |
| 6 | Condition A | GP-250 | 26.4 | 15% | GP-250 | 26.4 | 15% | ○ | ○ | ○ | ○ | ○ | Present Invention |

Fig. 4

Table 3

| | Aggregating treatment liquid | | Ink | | Remarks |
|---|---|---|---|---|---|
| | Time until drying | State after drying | Time until drying | Residual water content | |
| Condition A | Immediately after | Solid dispersion | Immediately after | 2 g/m² | Present Invention |
| Condition D | 5 seconds | Solid dispersion | 5 seconds | 2 g/m² | Present Invention |
| Condition E | Immediately after | Liquid (weak drying) | Immediately after | 5 g/m² | Comparative Example |
| Condition F | Immediately after | Solid dispersion | Immediately after | 5 g/m² | Comparative Example |
| Condition G | Immediately after | Liquid (weak drying) | Immediately after | 2 g/m² | Comparative Example |
| Condition H | 6 seconds | Solid dispersion | 6 seconds | 2 g/m² | Comparative Example |
| Condition I | 6 seconds | Solid dispersion | Immediately after | 2 g/m² | Comparative Example |
| Condition J | Immediately after | Solid dispersion | 6 seconds | 2 g/m² | Comparative Example |
| Condition K | 6 seconds | Liquid (weak drying) | 6 seconds | 5 g/m² | Comparative Example |

Fig. 5
Table 4

| Level | System | Ink HBS | | | Treatment liquid HBS | | | Landing interference | Floating of coloring material | Image contraction | Dot white spot reproducibility | Curl | Remarks |
|---|---|---|---|---|---|---|---|---|---|---|---|---|---|
| | | HBS type | SP value | Additive amount | HBS type | SP value | Additive amount | | | | | | |
| 7 | Condition A | GP-250 | 26.4 | 15% | GP-250 | 26.4 | 15% | ○ | ○ | ○ | ○ | ○ | Present invention |
| 8 | Condition D | GP-250 | 26.4 | 15% | GP-250 | 26.4 | 15% | ○ | ○ | ○ | ○ | ○ | Present invention |
| 9 | Condition E | GP-250 | 26.4 | 15% | GP-250 | 26.4 | 15% | ○ | × | - | × | × | Comp. Ex. |
| 10 | Condition F | GP-250 | 26.4 | 15% | GP-250 | 26.4 | 15% | ○ | ○ | ○ | × | × | Comp. Ex. |
| 11 | Condition G | GP-250 | 26.4 | 15% | GP-250 | 26.4 | 15% | ○ | × | - | × | × | Comp. Ex. |
| 12 | Condition H | GP-250 | 26.4 | 15% | GP-250 | 26.4 | 15% | ○ | ○ | ○ | × | × | Comp. Ex. |
| 13 | Condition I | GP-250 | 26.4 | 15% | GP-250 | 26.4 | 15% | ○ | ○ | ○ | × | × | Comp. Ex. |
| 14 | Condition J | GP-250 | 26.4 | 15% | GP-250 | 26.4 | 15% | ○ | ○ | ○ | × | × | Comp. Ex. |
| 15 | Condition K | GP-250 | 26.4 | 15% | GP-250 | 26.4 | 15% | ○ | × | - | × | × | Comp. Ex. |

Fig. 6

Table 5

| Condition | Aggregating treatment liquid | | Ink | | Remarks |
|---|---|---|---|---|---|
| | Time until drying | State after drying | Time until roller absorption | Residual water content | |
| Condition L | Immediately after | Solid dispersion | Immediately after | 2 g/m² | Present invention |

Fig. 7

Table 6

| Level | System | Ink HBS | | | Treatment liquid HBS | | | Landing interference | Floating of coloring material | Image contraction | Dot white spot reproducibility | Curl | Remarks |
|---|---|---|---|---|---|---|---|---|---|---|---|---|---|
| | | HBS type | SP value | Additive amount | HBS type | SP value | Additive amount | | | | | | |
| 16 | Condition L | GP-250 | 26.4 | 15% | GP-250 | 26.4 | 15% | ○ | ○ | ○ | ○ | ○ | Present invention |

Fig. 8

Table 7

| Level | System | Ink HBS | | | Treatment liquid HBS | | | Landing interference | Floating of coloring material | Image contraction | Dot white spot reproducibility | Curl | Remarks |
|---|---|---|---|---|---|---|---|---|---|---|---|---|---|
| | | HBS type | SP value | Additive amount | HBS type | SP value | Additive amount | | | | | | |
| 17 | Condition A | Glycerine | 40.97 | 15% | Glycerine | 40.97 | 15% | ○ | ○ | × | × | × | Comp. Ex. |
| 18 | Condition A | A | 30.62 | 15% | A | 30.62 | 15% | ○ | ○ | × | × | × | Comp. Ex. |
| 19 | Condition A | B | 27.4 | 15% | B | 27.4 | 15% | ○ | ○ | ○ | ○ | ○ | Present invention |
| 20 | Condition A | C | 27.2 | 15% | C | 27.2 | 15% | ○ | ○ | ○ | ○ | ○ | Present invention |
| 21 | Condition A | D | 24.7 | 15% | D | 24.74 | 15% | ○ | ○ | ○ | ○ | ○ | Present invention |
| 22 | Condition A | GP-250 | 26.4 | 15% | GP-250 | 26.4 | 15% | ○ | ○ | ○ | ○ | ○ | Present invention |
| 23 | Condition A | E | 22.4 | 15% | E | 22.4 | 15% | ○ | ○ | ○ | ○ | ○ | Present invention |
| 24 | Condition A | F | 21.1 | 15% | F | 21.1 | 15% | ○ | ○ | ○ | ○ | ○ | Present invention |
| 25 | Condition A | G | 18.8 | 15% | G | 18.8 | 15% | ○ | ○ | ○ | ○ | ○ | Present invention |

Fig. 9

Table 8

| Level | System | Ink HBS | | | Treatment liquid HBS | | | Landing interference | Floating of coloring material | Image contraction | Dot white spot reproducibility | Curl | Remarks |
|---|---|---|---|---|---|---|---|---|---|---|---|---|---|
| | | HBS type | SP value | Additive amount | HBS type | SP value | Additive amount | | | | | | |
| 26 | Condition A | GP-250 | 26.4 | 15% | B | 27.4 | 15% | ○ | ○ | ○ | ○ | ○ | Present invention |
| 27 | Condition A | GP-250 | 26.4 | 15% | C | 27.2 | 15% | ○ | ○ | ○ | ○ | ○ | Present invention |
| 28 | Condition A | GP-250 | 26.4 | 15% | D | 24.74 | 15% | ○ | ○ | ○ | ○ | ○ | Present invention |
| 29 | Condition A | GP-250 | 26.4 | 15% | E | 22.4 | 15% | ○ | ○ | ○ | ○ | ○ | Present invention |
| 30 | Condition A | GP-250 | 26.4 | 15% | F | 21.1 | 15% | ○ | ○ | ○ | ○ | ○ | Present invention |
| 31 | Condition A | GP-250 | 26.4 | 15% | G | 18.8 | 15% | ○ | ○ | ○ | ○ | ○ | Present invention |
| 32 | Condition A | E | 22.4 | 15% | GP-250 | 26.4 | 15% | ○ | ○ | ○ | ○ | ○ | Present invention |
| 33 | Condition A | E | 22.4 | 15% | B | 27.4 | 15% | ○ | ○ | ○ | ○ | ○ | Present invention |
| 34 | Condition A | B | 18.8 | 15% | F | 21.1 | 15% | ○ | ○ | ○ | ○ | ○ | Present invention |
| 35 | Condition A | F | 21.1 | 15% | C | 27.2 | 15% | ○ | ○ | ○ | ○ | ○ | Present invention |
| 36 | Condition A | D | 24.74 | 15% | C | 27.2 | 15% | ○ | ○ | ○ | ○ | ○ | Present invention |
| 37 | Condition A | E | 22.4 | 15% | F | 21.1 | 15% | ○ | ○ | ○ | ○ | ○ | Present invention |

Fig. 10

Table 9

| Level | System | Ink HBS | | | Treatment liquid HBS | | | Landing interference | Floating of coloring material | Image contraction | Dot white spot reproducibility | Curl | Light-fastness | Remarks |
|---|---|---|---|---|---|---|---|---|---|---|---|---|---|---|
| | | HBS type | SP value | Additive amount | HBS type | SP value | Additive amount | | | | | | | |
| 34 | Condition A | GP-250 | 2.64 | 95% | GP-250 | 2.64 | 95% | × | ○ | × | × | ○ | × | Comp. Ex. |
| 35 | Condition A | GP-250 | 2.64 | 90% | GP-250 | 2.64 | 90% | △ | ○ | △ | △ | ○ | × | Present invention |
| 36 | Condition A | GP-250 | 2.64 | 85% | GP-250 | 2.64 | 85% | △ | ○ | △ | △ | ○ | × | Present invention |
| 37 | Condition A | GP-250 | 2.64 | 35% | GP-250 | 2.64 | 35% | △ | ○ | △ | △ | ○ | × | Present invention |
| 38 | Condition A | GP-250 | 2.64 | 30% | GP-250 | 2.64 | 30% | ○ | ○ | ○ | ○ | ○ | ○ | Present invention |
| 39 | Condition A | GP-250 | 2.64 | 15% | GP-250 | 2.64 | 15% | ○ | ○ | ○ | ○ | ○ | ○ | Present invention |
| 40 | Condition A | GP-250 | 2.64 | 10% | GP-250 | 2.64 | 10% | ○ | ○ | ○ | ○ | ○ | ○ | Present invention |
| 41 | Condition A | GP-250 | 2.64 | 5% | GP-250 | 2.64 | 5% | ○ | × | ○ | ○ | × | ○ | Present invention |

Fig. 11

Table 10

| Level | System | Ink HBS | | | Treatment liquid HBS | | | Landing interference | Floating of coloring material | Image contraction | Dot white spot reproducibility | Curl | Light-fastness | Remarks |
|---|---|---|---|---|---|---|---|---|---|---|---|---|---|---|
| | | HBS type | SP value | Additive amount | HBS type | SP value | Additive amount | | | | | | | |
| 1 | Condition A | GP-250 | 26.4 | 15% | GP-250 | 26.4 | 15% | ○ | ○ | ○ | ○ | ○ | ○ | Comp. Ex. |
| 6 | Condition M | GP-250 | 26.4 | 15% | GP-250 | 26.4 | 15% | ○ | ○ | ○ | ○ | ○ | × | Present invention |

IMAGE FORMING METHOD AND IMAGE FORMING APPARATUS

BACKGROUND OF THE INVENTION

1. Field of the Invention

The present invention relates to an image forming method and an image forming apparatus, and more particularly, to an image forming apparatus and an image forming method whereby an image is formed on a recording medium by using an aggregating treatment liquid and an ink.

2. Description of the Related Art

In general, an inkjet recording apparatus comprises an inkjet head in which a plurality of nozzles are formed, and forms an image on a recording medium by ejecting ink droplets respectively from the nozzles onto a recording medium; such apparatuses are used widely due to their excellent low-noise operation, low running costs, and their ability to record images of high quality onto recording media of many different types.

However, when ink droplets are ejected onto a permeable recording medium which has ink receiving properties, then if droplets are ejected continuously to form adjacent dots which are mutually overlapping, the liquid ink droplets on the recording medium combine together due to surface tension, giving rise to bleeding (landing interference) which prevents the formation of desired dots. In the case of dots of the same color, the dots shape is disturbed and in the case of dots of different colors, an additional problem of color mixing occurs.

In order to suppress bleeding as described above, Japanese Patent Application Publication No. 2004-10633 discloses technology in which one of an aggregating treatment liquid (liquid component) and an ink is made acidic, the other is made alkaline, and the pigment aggregating properties on the surface of the paper are controlled so as to effectively improve the optical density, bleeding (temporal bleeding) and drying time.

Furthermore, Japanese Patent Application Publication No. 11-188858 discloses a recording method which enables high-speed recording without the occurrence of bleeding, by depositing a powder layer (water-soluble resin layer) which generates swelling, viscosity increase and separation by reaction with the ink.

However, in the method described in Japanese Patent Application Publication No. 2004-10633, when droplets of ink are ejected after depositing an aggregating treatment liquid onto a medium of low permeability, for instance, a non-permeable medium such as a plastic sheet, or coated paper, the coloring material which has landed and aggregated moves rather than remaining in the desired position. As a result of this, a new problem arises in that the output image is greatly disturbed in comparison with the desired image.

Furthermore, the following issues arise in the case of the method in Japanese Patent Application Publication No. 11-188858. (1) Since the coloring material in the ink is not aggregated actively, then when ink droplets are ejected at a fast rate of 10 kHz or above, the swelling and viscosity raising actions do not occur quickly enough and the landing interference described above still occurs. (2) Since the transferred image forming layer swells as the ink solvent is absorbed, then the thickness of the image portion increases, giving rise to a problems of the "pile height". If the image thickness becomes large, then not only is there a problem of image quality due to the change in appearance at the boundaries between a printed region and a non-printed region, there is also a problem in that a step difference will be noticeable when these boundaries portions are touched. (3) Since the ink solvent is absorbed in the transferred image forming layer, this ink solvent bleeds out onto the surface of the paper after transfer and gives rise to deformation of the paper (so-called "cockling"). (4) Since an intermediate transfer body is used, the system is complex. When the final image is formed on the recording medium (paper) while still containing ink solvent, problems (2) and (3) described above both can occur.

SUMMARY OF THE INVENTION

The present invention has been contrived in view of the circumstances described above, an object thereof being to provide an image forming method and an image forming apparatus whereby it is possible to prevent image disturbances caused by the movement of coloring material even when a droplet of ink are ejected onto a recording medium.

In order to attain an object described above, one aspect of the present invention is directed to an image forming method, comprising the steps of: depositing an aggregating treatment liquid containing 10% or more and 90% or less of a water-soluble high-boiling-point organic solvent having an SP value of 30 or lower onto a recording medium; starting drying of the aggregating treatment liquid deposited on the recording medium within five seconds after the step of depositing the aggregating treatment liquid onto the recording medium; ejecting an ink containing 10% or more and 90% or less of a water-soluble high-boiling-point organic solvent having an SP value of 30 or lower in accordance with an image signal, so as to be superimposed on the aggregating treatment liquid deposited on the recording medium; and removing water contained in a solvent of the ink on the recording medium in such a manner that the water contained in the ink becomes 4 $g/m^2$ or less when converted to a deposition volume.

According to this aspect of the invention, it is possible to prevent image disturbance caused by movement of coloring material by forming an image by means of: a step (A) of depositing onto a recording medium an aggregating treatment liquid containing 10% or more and 90% or less of a water-soluble high-boiling-point organic solvent having an SP (Solubility Parameter) value of 30 or lower; a step (B) of starting to dry the treatment liquid within five seconds of the step of depositing aggregating treatment liquid onto the recording medium; a step (C) of ejecting droplets of ink containing 10% or more and 90% or less of water-soluble high-boiling-point organic solvent having an SP value of 30 or lower, in accordance with an image signal, so as to be superimposed on the aggregating treatment liquid that has been deposited on the recording medium; and a step (D) of removing the water contained in the solvent of the ink on the recording medium, to a level of 4 $g/m^2$ or lower when converted to a deposition volume.

Desirably, the aggregating treatment liquid and the ink each contain 10% or more and 30% or less of the water-soluble high-boiling-point organic solvent having an SP value of 30 or lower.

As in this aspect of the invention, more desirably, the aggregating treatment liquid and the ink respectively contain 10% or more and 30% or less of a water-soluble high-boiling-point organic solvent having an SP value of 30 or lower.

If the content is 10% or more and 30% or less, then particularly desirable characteristics are obtained in terms of landing interference, image deformation, and small dot white spot reproducibility, and furthermore, the lightfastness of the formed image is also good.

Desirably, the image forming method comprises the step of fixing the ink on the recording medium after the step of removing the water contained in the solvent of the ink on the recording medium.

According to this aspect of the invention, it is possible further to prevent image disturbance due to movement of the coloring material by carrying out a step (E) of fixing the ink on the recording medium, after the removing step (D).

Desirably, in the step of fixing the ink on the recording medium, the ink on the recording medium is fixed by thermal pressurizing fixing.

According to this aspect of the invention, desirably, the step (E) of fixing the ink on the recording medium involves fixing by heating and pressurization.

Desirably, the recording medium is a coated paper.

In general, when droplets of ink are ejected onto a recording medium having low permeability, such as coated paper, after depositing an aggregating treatment liquid, the aggregated ink coloring material in the aggregating treatment liquid floats about and does not remain in the desired position, and consequently the output image is greatly disturbed in comparison with the desired image. Accordingly, the present invention is particularly valuable if the recording medium is a coated paper, and enables image disturbance caused by movement of the coloring material to be prevented effectively.

In order to attain an object described above, another aspect of the present invention is directed to an image forming apparatus, comprising: an aggregating treatment liquid deposition device which deposits an aggregating treatment liquid containing 10% or more and 90% or less of a water-soluble high-boiling-point organic solvent having an SP value of 30 or lower onto a recording medium; an aggregating treatment liquid drying device which dries the aggregating treatment liquid deposited on the recording medium within five seconds after the aggregating treatment liquid is deposited onto the recording medium; an ink droplet ejection device which ejects an ink containing 10% or more and 90% or less of a water-soluble high-boiling-point organic solvent having an SP value of 30 or lower in accordance with an image signal in such a manner that the ink is superimposed on the aggregating treatment liquid deposited on the recording medium; and a water removing device which removes water contained in a solvent of the ink on the recording medium in such a manner that the water contained in the ink becomes 4 $g/m^2$ or less when converted to a deposition volume.

Desirably, the image forming apparatus comprising an image fixing device which fixes, onto the recording medium, the ink from which the water has been removed in such a manner that the water contained in the ink becomes 4 $g/m^2$ or less when converted to a deposition volume.

The above image forming apparatuses are image forming apparatuses which carry out the image forming methods described above.

According to the present invention, in an image forming method and an image forming apparatus which form an image on a recording medium, it is possible to prevent disturbance of the image due to movement of the coloring material even when ink is ejected onto the recording medium.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein:

FIGS. 2 to 11 show Tables 1 to 10 indicating experimental conditions/results.

DETAILED DESCRIPTION OF THE PREFERRED EMBODIMENTS

Figure 1:
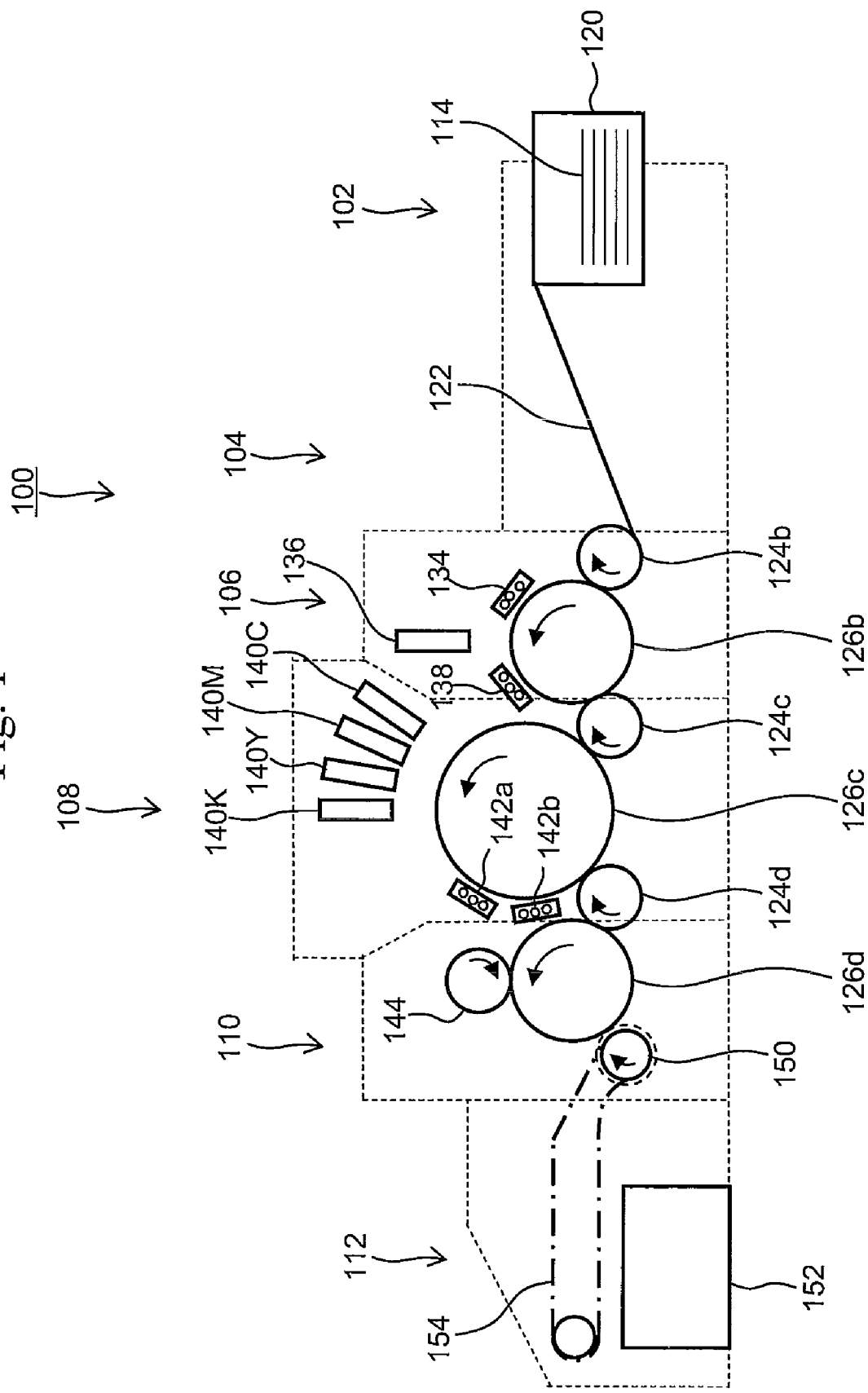
FIG. 1 is a schematic drawing illustrating one example of an image forming apparatus relating to an embodiment of the present invention.

An aggregating treatment liquid (hereinafter, also simply called "treatment liquid") and an ink used in embodiments of the present invention are first described below, and then an image forming method and an image forming apparatus according to embodiments of the present invention are described.

Treatment Liquid (Aggregating Treatment Liquid)

For the treatment liquid, it is possible to desirably use a treatment liquid which produces an aggregate by causing the pigment and polymer micro-particles contained in the ink to aggregate by changing the pH of the ink.

Desirably, the component of the treatment liquid is selected from amongst: polyacrylic acid, acetic acid, glycol acid, malonic acid, malic acid, malleinic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, cumaric acid, thiophene carboxylic acid, nicotinic acid, and derivatives of these compounds, and salts of these, and the like.

A desirable example of the treatment liquid is a treatment liquid to which a multivalent metal salt or polyallylamine has been added. These compounds may be used singly, or a combination of two or more of these compounds may be used.

From the viewpoint of the pH aggregating performance with respect to the ink, the treatment liquid desirably has a pH of 1 to 6, more desirably, a pH of 2 to 5, and particularly desirably, a pH of 3 to 5.

The added amount, in the treatment liquid, of the compound which causes aggregation of the ink pigment and polymer micro-particles, is desirably equal to or greater than 0.01 wt % (% by weight) and equal to or less than 20 wt %, with respect to the total weight of the liquid. If the amount is equal to or less than 0.01 wt %, then when the ink comes into contact with the treatment liquid, the concentration and dispersion do not advance sufficiently, and a sufficient aggregating action may not be produced by a change in the pH. When it is more than 20 wt %, there is a possibility that the ejection performance from an inkjet head declines.

The treatment liquid contains a water-soluble high-boiling-point organic solvent having an SP value of 30 or lower at a rate of equal to or greater than 10% and equal to or less than 90%. Examples of a water-soluble high-boiling-point organic solvent having an SP value of 30 or lower are, for instance:

diethylene glycol monoethyl ether (22.4), diethylene glycol monobutyl ether (21.5), triethylene glycol monobutyl ether (21.1), dipropylene glycol monomethyl ether (21.3), and dipropylene glycol (27.2).

Chemical Formula 1

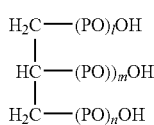

1 + m + n = 3  (26.4)

Chemical Formula 2

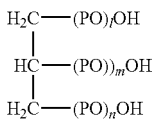

1 + m + n = 4  (24.9)

Chemical Formula 3

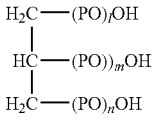

1 + m + n = 5  (23.9)

Chemical Formula 4

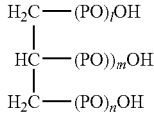

1 + m + n = 6  (23.2)

Chemical Formula 5

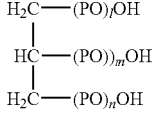

1 + m + n = 7  (22.6)

PO = propylene oxy (oxypropylene)

nC$_4$H$_9$O(AO)$_4$—H (AO=EO or PO, ratio 1:1) (20.1)
  EO=ethylene oxy(oxyethylene)
nC$_4$H$_9$O(AO)$_{10}$—H (as above) (18.8)
HO(A'O)$_{40}$—H (A'O=EO or PO, ratio EO:PO=1:3) (18.7)
HO(A"O)$_{55}$—H (A"O=EO or PO, ratio EO:PO=5:6) (18.8)
HO(PO)$_3$H (24.7)
HO(PO)$_7$H (21.2)
1,2 hexanediol (27.4)

The numbers in parenthesis indicate SP values. "SP value ((Hildebrand) Solubility Parameter value)" δ is defined as follows: δ=$\sqrt{(\Delta H-RT)/V}$, where ΔH stands for the "molar heat of vaporization", R stands for the "gas constant", T stands for the "absolute temperature", and V stands for the "molar volume", as known in the art.

Furthermore, of the solvents having a low SP value, it is desirable to include the following structure.

Chemical Formula 6

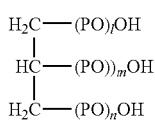

1 + m + n = 3 - 15

The above are possible examples. The SP value (solubility parameter) of the water-soluble high-boiling-point organic solvent described here is a value expressed as the square root of the molecular aggregation energy, and this value can be calculated by the method described in R. F. Fedors in Polymer Engineering Science, 14, p. 147 (1974). The unit is (MPa)$^{1/2}$ and indicates the value at 25° C.

These water-soluble high-boiling-point organic solvents can be used independently, or in plural fashion, together with other organic solvents.

In order to improve fixing ability and abrasive resistance, the treatment liquid may further include a resin component. Any resin component may be employed, provided that the ejection ability from a head is not degraded when the treatment liquid is ejected by an inkjet system and also provided that the treatment liquid will have high stability in storage. Thus, water-soluble resins and resin emulsions can be freely used.

An acrylic resin, a urethane resin, a polyester, a vinyl resin, and a styrene resin can be considered as the resin components. In order to demonstrate a sufficient function of improving the fixing ability, a polymer with a comparatively high molecular weight has to be added at a high concentration of 1 wt % to 20 wt %. However, where such a material is added to and dissolved in a liquid, the viscosity thereof increases and ejection ability is degraded. A latex can be effectively added as an adequate material that can be added to a high concentration, while inhibiting the increase in viscosity. Examples of latex materials include alkyl acrylate copolymers, carboxy-modified SBR (styrene-butadiene latex), SIR (styrene-isoprene) latex, MBR (methyl methacrylate-butadiene latex), and NBR (acrylonitrile-butadiene latex). From the standpoint of the process, in order to improve both the stability during storage at normal temperature and the transferability after heating, while ensuring a strong effect during fixing, it is preferred that the glass transition temperature Tg of the latex be not lower than 50° C. and not higher than 120° C. Furthermore, from the standpoint of the process, in order to obtain sufficient fixing at a low temperature, while ensuring a strong effect during fixing, it is preferred that the minimum film-formation temperature MFT be not higher than 100° C., more desirably not higher than 50° C.

The aggregation ability may be further improved by introducing polymer microparticles of reverse polarity with respect to that of the ink into the treatment liquid and causing the aggregation of the pigment contained in the ink with the polymer microparticles.

The aggregation ability may be also improved by introducing a curing agent corresponding to the polymer microparticle component contained in the ink into the treatment liquid, bringing the two liquids into contact, causing aggregation and also crosslinking or polymerization of the resin emulsion in the ink component.

The treatment liquid can include a surfactant.

Examples of suitable surfactants of a hydrocarbon system include anionic surfactants such as fatty acid salts, alkylsulfuric acid esters and salts, alkylbenzenesulfonic acid salts, alkylnaphthalenesulfonic acid salts, dialkylsulfosuccinic acid salts, alkylphosphoric acid esters and salts, naphthalenesulfonic acid formalin condensate, and polyoxyethylene alkylsulfuric acid esters and salts, and nonionic surfactants such as polyoxyethyelene alkyl ethers, polyoxyethylene alkylallyl ethers, polyoxyethylene fatty acid esters, sorbitan fatty acid esters, polyoxyethylene sorbitan fatty acid esters, polyoxyethylene alkylamines, glycerin fatty acid esters, and oxyethylene oxypropylene block copolymer. It is preferred that SURFYNOLS (manufactured by Air Products & Chemicals Co., Ltd.), which is an acetylene-type polyoxyethylene oxide surfactant, be used. Amineoxide-type amphoteric surfactants such as N,N-dimethyl-N-alkylamineoxide is also a preferred surfactant.

A surfactant described in Japanese Patent Application Publication No. 59-157636, pages 37 to 38 and Research Disclosure No. 308119 (1989) can be also used. Fluorine-containing (fluorinated alkyl system) and silicone-type surfactants such as described in Japanese Patent Application Publication Nos. 2003-322926, 2004-325707, and 2004-309806 can be also used. These surface tension adjusting agents can be also used as an antifoaming agent. Chelating agents represented by fluorine-containing or silicone-type compounds and EDTA can be also used.

These agents are effective in reducing surface tension and increasing wettability on the image formation body (recording medium, intermediate transfer medium, etc.). Further, even when the ink is the first to be deposited, effective aggregation action proceeds because of increased wettability of the ink and enlarged contact surface area of the two liquids.

The surface tension of the treatment liquid is desirably 10 to 50 mN/m, and furthermore, from the viewpoint of simultaneously achieving wetting properties on an intermediate transfer medium, a fine liquid droplet size, and good ejection properties, a surface tension of 15 to 45 mN/n is desirable.

Desirably, the viscosity of the treatment liquid is 1.0 to 20.0 cP.

Additionally, according to requirements, it is also possible to add a pH buffering agent, an antioxidant, an anti-rusting agent, a mildewcide, a viscosity adjuster, a conducting agent, an ultraviolet absorber, and the like.

Ink

For the ink, it is possible to use a water-soluble pigment-based ink which contains, as solvent-insoluble materials, a pigment which is a coloring material (colorant) and polymer micro-particles and the like.

Desirably, the density of the solvent-insoluble material is equal to or greater than 1 wt % and equal to or less than 20 wt %, taking account of the fact that the suitable viscosity for ejection is 20 mPa·s or lower. More desirably, the density of the pigment is 4 wt % or above, in order to obtain good optical density in the image.

Desirably, the surface tension of the ink is equal to or greater than 20 mN/m and equal to or less than 40 mN/m, taking account of ejection stability.

The coloring material used in the ink may be pigment particles or a combination of dye and pigment. From the viewpoint of the aggregating properties upon contact with the treatment liquid, a pigment which is in a dispersed state in the ink is desirable, since this aggregates more effectively. Of pigments, it is particularly desirable to use a pigment which is dispersed by a dispersant, a self-dispersing pigment, a pigment in which the surfaces of the pigment particles are covered with a resin (microcapsule pigment), or a polymer grafted pigment. Furthermore, from the viewpoint of the aggregating properties of the pigment, a more desirable mode is one where the pigment is modified with a carboxyl group having a low degree of disassociation.

There are no particular restrictions on the resin used in a microcapsule pigment, but it is desirable to use a polymer compound having self-dispersing properties or solubility in water, and having an anionic group (acidic properties). Normally, this resin desirably has a numerical average molecular weight in the range of approximately 1,000 to 100,000, and particularly desirably, in the range of approximately 3,000 to 50,000. Furthermore, desirably, the resin is formed as a solution by dissolving in an organic solvent. By setting the numerical average molecular weight of the resin to this range, it is possible to display a satisfactory function as a coating film in the pigment, or as a coating film in the ink composition.

It is possible for the resin to be self-dispersing or soluble, or for these functions to be imparted to the polymer by means of some kind. For example, it is possible to use a resin in which an anionic group such as a carboxyl group, a sulfonate group, a phosphonate group, or the like, has been introduced, by neutralizing with an organic amine or alkali metal. Moreover, it is also possible to use a resin in which one or two or more of the same anionic group or different anionic groups has been introduced. In embodiments of the present invention, it is desirable to use a resin in which a carboxyl group is introduced by neutralizing with a base.

There are no particular restrictions on the pigment used, but possible specific examples of an orange or yellow pigment are, for instance: C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 151, C.I. Pigment Yellow 155, C.I. Pigment Yellow 180, C.I. Pigment Yellow 185, and the like. Possible examples of a red or magenta pigment are, for instance: C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48: 1, C.I. Pigment Red 53: 1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222, and the like.

Possible examples of a green or cyan pigment are, for instance: C.I. Pigment Blue 15, C.I. Pigment Blue 15:2, C.I. Pigment Blue 15:3, C.I. Pigment Blue 16, C.I. Pigment Blue 60, C.I. Pigment Green 7, and the like.

Furthermore, possible examples of a black pigment are, for instance: C.I. Pigment Black 1, C.I. Pigment Black 6, C.I. Pigment Black 7, and the like.

Desirably, as a component which reacts with the treatment liquid, polymer micro-particles which do not contain a colorant are added to a coloring ink liquid. The polymer micro-particles enhance the aggregating action and viscosity increasing action of the ink upon reaction with the treatment liquid, and thereby make it possible to improve the image quality. In particular, it is possible to obtain an ink having high stability by including anionic polymer micro-particles in the ink.

By using polymer micro-particles which produce a viscosity increasing action and aggregating action upon reaction with the treatment liquid, it is possible to improve image quality, while at the same time, depending on the type of polymer micro-particles used, beneficial effects are obtained in further improving the weatherproofing and waterproofing properties of the image due to the polymer micro-particles forming a coating on the recording medium.

The method of dispersing in a polymer ink is not limited to an emulsion, and it may be present in the state of a solution or in the state of a colloidal dispersion.

The polymer micro-particles may be dispersed by using an emulsifier, or without using an emulsifier. For the emulsifier, generally, a surfactant of low molecular weight is used, but it is also possible to use a surfactant of high molecular weight as the emulsifier. It is also desirable to use capsule type polymer micro-particles in which the outer shell is made of acrylic acid, methacrylic acid, or the like (namely, core-shell type polymer micro-particles which have a different composition between the central portion and the outer edge portion).

As the dispersion method, polymer micro-particles which do not use a low-molecular weight surfactant include polymer micro-particles using a high-polymer surfactant and polymer micro-particles which do not include an emulsifier, and these are known as a soap-free latex. For example, this includes polymer micro-particles which use, as an emulsifier, a polymer having a group which is soluble in water, such as a sulfonate group, a carboxylic acid group, or the like, as described above (a polymer with a grafted soluble group, or a block polymer obtained from a monomer having a soluble group and a monomer having an insoluble part).

In particular, it is desirable to use a soap-free latex, since compared to polymer micro-particles which are polymerized using a conventional emulsifier, a soap-free latex avoids concerns such as the emulsifier obstructing the reaction aggregation and film formation of the polymer micro-particles, and the separated emulsifier moving to the surface after the formation of a film of the polymer micro-particles and reducing the adhesiveness between the aggregate body formed by the combined pigment and polymer micro-particles and the recording medium.

Possible examples of a resin component which is added to the ink in the form of polymer micro-particles include: an acrylic resin, a vinyl acetate resin, a styrene-butadiene resin, a vinyl chloride resin, an acryl-styrene resin, a butadiene resin, a styrene resin, and the like.

A material having a carboxylic acid group with a low degree of disassociation is more desirable, from the viewpoint of imparting fast aggregating properties to the polymer micro-particles. Since the carboxylic acid group is liable to be affected by change in the pH, the state of dispersion is liable to change, and hence the aggregating properties are high.

The change in the state of dispersion of the polymer micro-particles caused by change in the pH can be adjusted by means of the content ratio of the constituent components of the polymer micro-particles which contain a carboxylic acid group, such as ester acrylate, or the like, and it can also be adjusted by means of an anionic surfactant which is used as a dispersant.

Desirably, the resin component of the polymer micro-particles is a polymer which combines a hydrophilic part and a hydrophobic part. By incorporating a hydrophobic part, the hydrophobic part is oriented toward to the inner side of the polymer micro-particle, and the hydrophilic part is oriented efficiently toward the outer side, thereby having the effect of further increasing the change in the dispersion state caused by change in the pH of the liquid. Therefore, aggregation can be performed more efficiently.

Desirably, a carboxylic acid polymer is used as an acid polymer.

Since the pKa of carboxylic acid is approximately 3 to 4, then if the pH is 5, the acid polymer assumes an almost separated state and therefore has stable dispersion characteristics due to electric repulsion, and aggregation does not occur. If the pH is lower than this, then the polymer assumes a non-separated state, the electric repulsion is lost and aggregation arises.

Examples of commercial polymer micro-particles include: Joncryl 537, 7640 (a styrene-acrylic resin emulsion, made by Johnson Polymer Corp.), Microgel E-1002, E-5002 (a styrene-acrylic resin emulsion, made by Nippon Paint Co., Ltd.), Boncoat 4001 (an acrylic resin emulsion, made by DIC Corporation), Boncoat 5454 (a styrene-acrylic resin emulsion, made by DIC Corporation), SAE-1014 (a styrene-acrylic resin emulsion, made by Zeon Corporation), Jurymer ET-410, FC-30, (an acrylic resin emulsion, made by Nihon-junyaku Co., Ltd.), Aron HD-5, A-104 (an acrylic resin emulsion, made by Toagosei Co., Ltd.), Saibinol SK-200 (an acrylic resin emulsion, made by Saiden Chemical Industry Co., Ltd.), "Zaicsen" L, (an acrylic resin emulsion, made by Sumitomo Seika Chemicals Co., Ltd.), and the like, but the polymer micro-particles are not limited to these products.

The weight ratio of the added amount of polymer micro-particles with respect to the pigment is desirably from 2:1 to 1:10, and more desirably, from 1:1 to 1:3. If the weight ratio of the added amount of polymer micro-particles with respect to the pigment is smaller than 2:1, then the aggregating force of the aggregate body is not increased effectively by the fusion of the resin. Moreover, even if the added amount is greater than 1:10, the viscosity of the ink becomes too high and the ejection reliability and other factors deteriorate.

In view of the adhesive force when the polymer micro-particles fuse, it is desirable that the molecular weight of the polymer micro-particles added to the ink should be 5,000 or greater. If the molecular weight is less than 5,000, then insufficient effects are obtained in increasing the internal aggregating force of the ink aggregate body when aggregation occurs, or improving the fixing properties of the image to the recording medium, and furthermore, the effects in improving image quality are inadequate.

Desirably, the volume-average particle size (diameter) of the polymer micro-particles is in the range of 10 nm to 1 µm, more desirably, the range of 10 to 500 nm, even more desirably, the range of 20 to 200 nm, and particularly desirably, the range of 50 to 200 nm. If the particle size is less than 10 nm, then significant effects in improving the image quality or enhancing transfer characteristics cannot be expected, even if aggregation occurs. If the particle size is equal to or greater than 1 µm, then there is a possibility that the ejection characteristics from the ink head or the storage stability deteriorate. Furthermore, there are no particular restrictions on the volume-average particle size distribution of the polymer particles; therefore, they may have a broad volume-average particle size distribution, or they may have a mono-disperse volume-average particle size distribution.

Moreover, two or more types of polymer micro-particles may be used in combination in the ink.

It is possible to use an organic salt or an inorganic alkaline base as a neutralizing pH adjuster which is added to the ink. Desirably, a pH adjuster is added so as to adjust the ink to a pH of 6 to 10, in order to improve the storage stability of the inkjet ink.

The water-soluble high-boiling-point organic solvent having an SP value of 30 or lower is contained at a rate of 10 wt % to 90 wt % with the object of preventing blockages of the nozzles of the inkjet head due to drying. A water-soluble high-boiling-point organic solvent of this kind includes a moistening agent or a penetrating agent. Similarly to the case of the treatment liquid, water-soluble high-boiling-point organic solvents having an SP value of 30 or lower include, for instance:

diethylene glycol monoethyl ether (22.4), diethylene glycol monobutyl ether (21.5), triethylene glycol monobutyl ether (21.1), dipropylene glycol monomethyl ether (21.3), and dipropylene glycol (27.2).

Chemical Formula 1

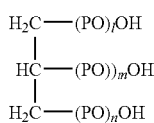

1 + m + n = 3  (26.4)

Chemical Formula 2

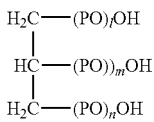

1 + m + n = 4  (24.9)

Chemical Formula 3

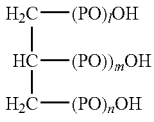

1 + m + n = 5  (23.9)

Chemical Formula 4

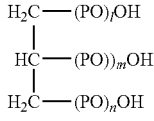

1 + m + n = 6  (23.2)

Chemical Formula 5

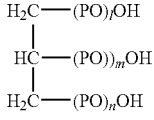

1 + m + n = 7  (22.6)
PO = propylene oxy (oxypropylene)

$nC_4H_9O(AO)_4$—H(AO=EO or PO, ratio 1:1)  (20.1)
   EO=ethylene oxy(oxyethylene)
$nC_4H_9O(AO)_{10}$—H (as above) (18.8)
$HO(A'O)_{40}$—H(A'O=EO or PO, ratio EO:PO=1:3) (18.7)
$HO(A''O)_{55}$—H(A''O=EO or PO, ratio EO:PO=5:6) (18.8)
$HO(PO)_3H$ (24.7)
$HO(PO)_7H$ (21.2)
1,2 hexanediol (27.4)

The numbers in parenthesis indicate SP values.

Furthermore, of the solvents having a low SP value, it is desirable to include the following structure.

Chemical Formula 6

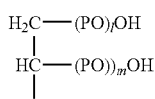

1 + m + n = 3 - 15

The above are possible examples.

The ink may also contain a surfactant. Desirable examples of the surfactant are: in a hydrocarbon system, an anionic surfactant, such as a salt of a fatty acid, an alkyl sulfate ester, an alkyl benzene sulfonate, an alkyl naphthalene sulfonate, a dialkyl sulfosuccinate, an alkyl phosphate ester, a naphthalene sulfonate/formalin condensate, a polyoxyethylene alkyl sulfuric ester, and the like; and a non-ionic surfactant, such as a polyoxyethylene alkyl ether, a polyoxyethylene alkyl aryl ether, a polyoxyethylene fatty acid ester, a sorbitan fatty acid ester, a polyoxyethylene sorbitan fatty acid ester, a polyoxyethylene alkyl amine, a glycerine fatty acid ester, an oxyethylene oxypropylene block copolymer, and the like. Furthermore, it is also desirable to use SURFYNOLS (Air Products & Chemicals, Inc.), which is an acetylene-based polyoxyethylene oxide surfactant. Furthermore, an amine oxide type of amphoteric surfactant, such as N,N-dimethyl-N-alkyl amine oxide, is also desirable.

Moreover, it is also possible to use the surfactants described in pages "(37)" to "(38)" of the Japanese Patent Application Publication No. 59-157636 or Research Disclosure No. 308119 (1989). Furthermore, it is also possible to use a fluorine (alkyl fluoride) type, or silicone type of surfactant such as those described in Japanese Patent Application Publication No. 2003-322926, Japanese Patent Application Publication No. 2004-325707, and Japanese Patent Application Publication No.2004-309806. It is also possible to use a surface tension adjuster of this kind as an anti-foaming agent; and a fluoride or silicone compound, or a chelating agent, such as EDTA, can also be used.

By reducing the surface tension, it is possible to improve the wetting properties on the layer of solid or semi-solid aggregating treatment liquid, and thus to increase the rate of spreading.

More desirably, the surface tension of the ink is 15 to 45 mN/m, from the viewpoint of simultaneously achieving good wetting properties on an intermediate transfer medium when recording by an intermediate transfer method, as well as finer size of the liquid droplets and good ejection characteristics.

Desirably, the ink viscosity is 1.0 to 20.0 cP.

Additionally, according to requirements, it is also possible to add a pH buffering agent, an antioxidant, an anti-rusting agent, a mildewcide, a viscosity adjuster, a conducting agent, an ultraviolet absorber, or the like.

Image Forming Method and Apparatus

Next, an image forming method and an image forming apparatus according to an embodiment of the invention are described.

FIG. 1 is a general schematic drawing illustrating an image forming apparatus according to an embodiment of the present invention. The image forming apparatus 100 illustrated in FIG. 8 is a single side machine, which is capable of printing only onto one surface of a recording medium 114. The image forming apparatus 100 includes: a paper supply unit 102, which supplies the recording medium 114; a treatment agent deposition unit 106, which deposits treatment agent onto the recording medium 114; a print unit (image forming unit) 108, which forms an image by depositing the colored inks onto the recording medium 114; a fixing unit 110 fixing the ink on the recording medium 114 onto the recording medium 114; and a paper output unit 112, which conveys and outputs the recording medium 114 on which the image has been formed.

A paper supply platform 120 on which the recording media 114 are stacked is provided in the paper supply unit 102. A feeder board 122 is connected to the front (the left-hand side in FIG. 1) of the paper supply platform 120, and the recording media 114 stacked on the paper supply platform 120 are supplied one sheet at a time, successively from the uppermost sheet, to the feeder board 122. The recording medium 114 that has been conveyed to the feeder board 122 is supplied through a transfer drum 124b to the surface (circumferential surface) of a pressure drum 126b of the treatment agent deposition unit 106.

The treatment agent deposition unit 106 is provided following the paper supply unit 102. The transfer drum 124b is provided between the paper supply unit 102 and the pressure drum 126b of the treatment agent deposition unit 106 so as to make contact with them. In this structure, the recording medium 114 is conveyed to the pressure drum 126b of the treatment agent deposition unit 106 via the transfer drum 124b.

The paper preheating unit 134 and the treatment liquid drying unit 138 have heaters that can be temperature-controlled within prescribed ranges, respectively. When the recording medium 114 held on the pressure drum 126b passes through the positions opposing the paper preheating unit 134 and the permeation suppression agent drying unit 138, it is heated by the heaters of these units.

The treatment liquid head 136 ejects droplets of the treatment liquid onto the recording medium 114 held on the pressure drum 126b, and can have the same structure as each of the ink heads 140C, 140M, 140Y, and 140K of the print unit 108 described later. An inkjet head is used as the device depositing the treatment liquid on the surface of the recording medium 114 in the present embodiment; however, a device depositing the treatment liquid is not limited to the present embodiment. Such a device applying the treatment liquid may employ various methods, such as a spray method and a roller applying method.

The treatment liquid used in the present embodiment is an acidic liquid which aggregates the coloring materials contained in the inks ejected toward the recording medium 114 from the respective ink heads 140C, 140M, 140Y and 140K arranged in the print unit 108, which is located in the latter stage.

In the present embodiment, the heating preformed by the heater of the treatment liquid drying unit 138 is carried out within 5 seconds of depositing the treatment liquid on the surface of the recording medium 114 by the treatment liquid head 136. Consequently, it is desirable that the treatment liquid drying unit 138 should be located in the vicinity of the treatment liquid head 136.

The heating temperature of the heater of the treatment liquid drying unit 138 is set to a temperature whereby the treatment liquid is dried and a solid or semi-solid layer of aggregating treatment agent (a thin layer of dried treatment liquid) is formed on the recording medium 114. Reference here to the "layer of aggregating treatment agent in a solid state or a semi-solid state" includes a layer having a water content of 0% to 70%. In the present specification, a "solid or semi-solid aggregating treatment agent (aggregating treatment agent layer)" indicates a water content ratio of 0 to 70% in the aggregating treatment agent (aggregating treatment agent layer). Here, "water content ratio" means the ratio between the weight $X_1$ (g/m$^2$) per unit surface area of the aggregating treatment agent and the weight $X_2$ (g/m$^2$) per unit surface area of the water contained in the aggregating treatment agent (i.e. $X_2/X_1$).

From Table 1 indicated in FIG. 2, it can be seen that movement of coloring material can be prevented by evaporating the treatment liquid to achieve a water content ratio of 70% or less.

The drying of the aggregating treatment liquid must start within 5 seconds after the application of the treatment liquid. Dot white spot reproducibility is obtained if drying is carried out within 5 seconds, and curling can also be suppressed.

A desirable mode is one in which the recording medium 114 is preheated by the heater of the paper preheating unit 134, before depositing the treatment liquid on the recording medium 114, as in the present embodiment. In this case, it is possible to restrict the heating energy required to dry the treatment liquid to a low level, and therefore energy savings can be made.

The print unit 108 is arranged after the treatment liquid deposition unit 106. A transfer drum 124c is arranged between the pressure drum 126b of the treatment liquid deposition unit 106 and a pressure drum 126c of the print unit 108, so as to make contact with same. Hence, after the treatment liquid is deposited and the solid or semi-solid aggregating treatment agent layer is formed on the recording medium 114 that is held on the pressure drum 126b of the treatment liquid deposition unit 106, the recording medium 114 is transferred through the transfer drum 124c to the pressure drum 126c of the print unit 108.

The print unit 108 is provided with the ink heads 140C, 140M, 140Y and 140K, which correspond respectively to the four colors of ink, C, M, Y and K, and solvent drying units 142a and 142b at positions opposing the surface of the pressure drum 126c, in this order from the upstream side in terms of the direction of rotation of the pressure drum 126c (the counter-clockwise direction in FIG. 1).

The ink heads 140C, 140M, 140Y and 140K employ the inkjet type recording heads (inkjet heads), similarly to the treatment liquid head 136. The ink heads 140C, 140M, 140Y and 140K respectively eject droplets of corresponding colored inks onto the recording medium 114 held on the pressure drum 126c.

Each of the ink heads 140C, 140M, 140Y and 140K is a full-line head having a length corresponding to the maximum width of the image forming region of the recording medium 114 held on the pressure drum 126c, and having a plurality of nozzles 161 (not illustrated in FIG. 1) for ejecting the ink, which are arranged on the ink ejection surface of the head through the full width of the image forming region. The ink heads 140C, 140M, 140Y and 140K are arranged so as to extend in a direction that is perpendicular to the direction of rotation of the pressure drum 126c (the conveyance direction of the recording medium 114).

According to the composition in which the full line heads having the nozzle rows covering the full width of the image forming region of the recording medium 114 are provided respectively for the colors of ink, it is possible to record a primary image on the image forming region of the recording medium 114 by performing just one operation of moving the recording medium 114 and the ink heads 140C, 140M, 140Y and 140K relatively with respect to each other (in other words, by one sub-scanning action). Therefore, it is possible to achieve a higher printing speed compared to a case that uses a serial (shuttle) type of head moving back and forth reciprocally in the main scanning direction, which is the direction perpendicular to the sub-scanning direction or the conveyance direction of the recording medium 114, and hence it is possible to improve the print productivity.

Moreover, although the configuration with the four colors of C, M, Y and K is described in the present embodiment, the combinations of the ink colors and the number of colors are not limited to those. Light and/or dark inks, and special color inks can be added as required. For example, a configuration is possible in which ink heads for ejecting light-colored inks, such as light cyan and light magenta, are added. Furthermore, there is no particular restriction on the arrangement sequence of the heads of the respective colors.

Each of the solvent drying units 142a and 142b has a composition including a heater of which temperature can be controlled within a prescribed range, similarly to the paper preheating unit 134, the permeation suppression agent drying unit, and the treatment liquid drying unit 138 described above. As described hereinafter, when ink droplets are deposited onto the solid or semi-solid aggregating treatment agent layer, which has been formed on the recording medium 114, an ink aggregate (coloring material aggregate) is formed on the recording medium 114, and furthermore, the ink solvent that has separated from the coloring material spreads, so that a liquid layer containing dissolved aggregating treatment agent is formed. The solvent component (liquid component) left on the recording medium 114 in this way is a cause of curling of the recording medium 114 and also leads to deterioration of the image. Therefore, in the present embodiment, after depositing the droplets of the corresponding colored inks from the ink heads 140C, 140M, 140Y and 140K onto the recording medium 114, heating is carried out by the heaters of the solvent drying units 142a and 142b, and the solvent component is evaporated off and the recording medium 114 is dried.

Here, in the present embodiment, water contained in the solvent of ink is reduced in such a manner that the water becomes equal to or less than 4 $g/m^2$ when converted to a deposition volume. The method of reducing the solvent may be any methods that reduce the solvent on the substrate, but methods which use drying as in the present embodiment or a solvent absorbing member are desirable. As a method using drying, a method using heat, a method using wind, or a method using both heat and wind is desirably used for example. As a method of providing heating, a method in which a conveyance member is heated and thereby it is heated from the rear surface, a non-contact heating method using a device emitting radiant heat such as IR heater (Infrared Heater), or a method using both of them can be desirably used for example. As a method using a solvent absorbing member, a method using a porous member is desirably used. The porosity diameter of such a porous member is desirably from 1 μm to 100 μm, and more desirably from 5 μm to 80 μm. As the material of such a porous member, a polymer porous member, a ceramics porous member, or a metallic porous member can be used. In cases of using a polymer porous member as the material of such a porous member, a soft material can be selected and this is desirable in increasing the adhesiveness against the surface of the substrate. From the view point of carrying out continuous processing, the roller shape is desirable.

In the present embodiment, the fixing unit 110 is provided following the print unit 108. A transfer drum 124d is arranged between the pressure drum 126c of the print unit 108 and the pressure drum 126d of the fixing unit 110 so as to make contact with same. Hence, the recording medium 114 held on the pressure drum 126c of the print unit 108 is transferred through the transfer drum 124d to the pressure drum 126d of the fixing unit 110.

The fixing unit 110 includes a heating roller 144 the temperature of which is adjustable in the range of 50° C. through 200° C., and fixes the image onto the recording medium 114 while heating and pressurizing the recording medium sandwiched between the pressure drum 126d and the heating roller 144. The heating temperature of the fixing unit 110 is desirably set according to the temperature of glass transition point of the polymer fine particles contained in the ink, or the like. In the present embodiment, the heating temperature of the fixing unit 110 is set to 130° C. In addition, the nip pressure of the fixing unit 110 is desirably set to 0.5 MPa thorough 10 MPa.

The paper output unit 112 is provided following the fixing unit 110. The paper output unit 112 is provided with a paper outputting drum 150 which receives the recording medium 114, a paper outputting base 152 which accommodates the recording media 114, and a paper outputting chain 154 which is provided between a sprocket of the paper outputting drum 150 and a sprocket arranged above the paper outputting base 152 and has a plurality of grippers for outputting paper. The recording medium 114 transferred to the paper outputting drum 150 from the pressure drum 126d is conveyed to the paper outputting base 152 by the paper outputting chain 154.

In the present embodiment, desirably, the recording medium is coated paper. In general, when droplets of ink are ejected onto a recording medium having low permeability, such as coated paper, after depositing an aggregating treatment liquid, the aggregated ink coloring material in the aggregating treatment liquid floats and does not remain in the desired position, and consequently the output image is greatly disturbed in comparison with the desired image. Accordingly, the present embodiment is particularly valuable if the recording medium is a coated paper, and enables image disturbance caused by movement of the coloring material to be prevented effectively.

Possible examples of support media which can be used appropriately for coated paper include: an art paper, a coated paper, and other coated papers such as a cast coated paper, in which a coat layer is provided on a base paper, a size press layer or an anchor coating layer formed using starch, polyvinyl alcohol, or the like is provided on a base paper, or a coat layer is provided on such a size press layer or an anchor coating layer. Such a base paper can be manufactured from main components of wood pulp and pigment mixed with a binder and one or more additive of a sizing agent, fixing agent, yield enhancer, cationization agent, paper strength enhancer, and other additive agents, by using various machines, such as a Fourdrinier paper machine, a cylindrical paper machine, a twin-wire paper machine, and the like. The pulp is either a chemical pulp such as LBKP or NBKP, a mechanical pulp such as GP, PGW, RMP, TMP, CTMP, CMP, CGP, or the like, or recovered paper pulp such as DIP.

In a method according to an embodiment of the present invention, it is possible to use these base papers or coated papers directly without alteration, and it is also possible to use these papers after carrying out a calendering process using a machine calender, TG calender, soft calender, or the like, and thereby controlling the surface flatness of the paper.

There are no particular restrictions on the weight of the support medium, although generally the weight is approximately 40 to 300 $g/m^2$. The coated paper used in embodiments of the present invention has a coating layer formed on the support medium described above. The coating layer comprises a coating composition including a pigment and a binder as main components thereof, and at least one coating layer is formed on the support medium.

For the pigment, it is desirable to use a white pigment. Possible examples of the white pigment include: an inorganic pigment, such as precipitated calcium carbonate, heavy calcium carbonate, magnesium carbonate, kaolin, talc, calcium sulfate, barium sulfate, titanium dioxide, zinc acid, zinc sulfide, zinc carbonate, satin white, aluminum silicate, diatomaceous earth, calcium silicate, magnesium silicate, synthetic non-crystalline silica, colloidal silica, alumina, colloidal alumina, pseudo-boehmite, aluminum hydroxide, lithopone, zeolite, hydrated halloysite, magnesium hydroxide, and the like; and an organic pigment, such as a styrene-based plastic pigment, an acrylic plastic pigment, polyethylene, microcapsules, urea resin, melamine resin, and the like.

The binder may be, for instance: a starch derivative, such as oxidized starch, etherified starch, or phosphoric acid esterized starch; a cellulose derivative, such as carboxymethyl cellulose, hydroxyethyl cellulose, or the like; casein, gelatine, soybean protein, polyvinyl alcohol, or derivatives of same; polyvinyl alcohols having various degrees of saponification or silanol-denatured versions of same, or carboxylates, cationized products, of other derivatives of same; polyvinyl pyrrolidone, maleic anhydride resin, a styrene-butadiene copolymer, a methyl methacrylate-butadiene copolymer, or other conjugated diene copolymer latex; an acrylic polymer latex, such as a polymer or copolymer of acrylate ester and methacrylate ester; a vinyl polymer latex, such as such as an ethylene acetate vinyl copolymer; or a functional group-denatured polymer latex based on these various polymers and a monomer containing a functional group such as a carboxy group; an aqueous adhesive of a heat-curable synthetic resin, such as melamine resin, urea resin, or the like; an acrylate ester or methacrylate ester polymer or copolymer resin, such as polymethylmethacrylate; or a synthetic resin-based adhesive, such as polyurethane resin, unsaturated polyester resin, vinyl chloride-vinyl acetate copolymer, polyvinyl butylal, alkyd resin, or the like.

The combination ratio of the pigment and binder in the coating layer is 3 to 70 parts by weight, and desirably 5 to 50 parts by weight, of binder with respect to 100 parts by weight of pigment. If the combination ratio of the binder with respect to 100 parts by weight of pigment is less than 3 parts by weight, then the coating of the ink receiving layer by the coating composition will have insufficient strength. On the other hand, if the combination ratio is greater than 70 parts by weight, then the supply of high-boiling-point solvent is slowed dramatically.

Moreover, it is also possible to combine various additives in appropriate fashion in the coating layer, such as: a dye fixing agent, a pigment dispersant, a viscosity raising agent, a fluidity enhancer, an antifoaming agent, a foam suppressant, a separating agent, a foaming agent, a permeating agent, a coloring dye, a coloring pigment, a fluorescent brightener, an ultraviolet light absorber, an antioxidant, an anticorrosive, an antibacterial agent, a waterproofing agent, a wet paper strength enhancer, a dry paper strength enhancer, or the like.

The application amount of the ink receiving layer varies depending on the required gloss, the ink absorbing properties and the type of support medium, or the like, and although no general figure can be stated, it is normally 1 g/m² or greater. Furthermore, the ink receiving layer can also be applied by dividing a certain uniform application amount into two application steps. If application is divided into two steps in this way, then the gloss is improved in comparison with a case where the same application amount is applied in one step.

The application of the coating layer can be carried out using one of various type of apparatus, such as a blade coater, roll coater, air knife coater, bar coater, rod blade coater, curtain coater, short dowel coater, size press, or the like, in on-machine or off-machine mode. Furthermore, after application of the coating layer, it is also possible to carry out a smoothing and finishing process on the ink receiving layer by using a calender apparatus, such as a machine calender, a TG calender, a soft calender, or the like.

The number of coating layers can be determined appropriately in accordance with requirements.

The coating paper may be an art paper, high-quality coated paper, medium-quality coated paper, high-quality lightweight coated paper, medium-quality lightweight coated paper, or light-coated printing paper; the application amount of the coating layer is around 40 g/m² on both surfaces in the case of art paper, around 20 g/m² on both surfaces in the case of high-quality coated paper or medium-quality coated paper, around 15 g/m² on both surfaces in the case of high-quality lightweight coated paper or medium-quality lightweight coated paper, and around 12 g/m² or less on both surfaces in the case of a light-coated printing paper. An example of an art paper is Tokubishi Art, or the like; an example of a high-quality coated paper is "U-Lite"; examples of art papers are Tokubishi Art (made by Mitsubishi Paper Mills Co., Ltd.), Golden Cask Satin (made by Oji Paper Co., Ltd.), or the like; examples of coated papers are OK Top Coat (made by Oji Paper Co., Ltd.), Aurora Coat (made by Nippon Paper Group Inc.), Recycle Coat T-6 (made by Nippon Paper Group Inc.); examples of lightweight coated papers are U-Lite (made by Nippon Paper Group Inc.), New V Matt (made by Mitsubishi Paper Mills Co., Ltd.), New Age (made by Oji Paper Co., Ltd.), Recycle Mat T-6 (made by Nippon Paper Group Inc.), and "Pism" (made by Nippon Paper Group Inc.). Examples of light-coated printing papers are Aurora L (made by Nippon Paper Group Inc.) and Kinmari Hi-L (made by Hokuetsu Paper Mills, Ltd.), or the like. Moreover, examples of cast coated papers are: SA Gold Cask plus (made by Oji Paper Group Inc.), Hi-McKinley Art (Gojo Paper Mfg. Co., Ltd.), or the like.

It is possible to prevent image disturbance caused by movement of coloring material by forming an image using the treatment liquid, ink and image forming method described above, in other words, by means of: a step of depositing onto a recording medium an aggregating treatment liquid containing 10% or more and 90% or less of a water-soluble high-boiling-point organic solvent having an SP value of 30 or lower; a step of drying the treatment liquid deposited on the recording medium within five seconds of the step of depositing same; a step of ejecting droplets of ink containing 10% or more and 90% or less of water-soluble high-boiling-point organic solvent having an SP value of 30 or lower, in accordance with an image signal, so as to be superimposed on the aggregating treatment liquid that has been deposited on the recording medium; and a step of removing the water contained in the solvent of the ink on the recording medium, to a level of 4 g/m² or lower when converted to a deposition volume.

PRACTICAL EXAMPLES

The present invention is described in specific terms below with reference to practical examples, but the present invention is not limited to these examples.

(1) Overall Composition of System and Respective Processing Steps

In the image forming apparatus illustrated in FIG. 1, an image is formed by depositing a treatment liquid on a base material, drying the treatment liquid, ejecting droplets of ink and then drying the ink.

The treatment liquid head supplies an aggregating treatment liquid at a thickness of 5 μm to the whole surface of the base material inserted into the apparatus. There is also a mode in which the aggregating treatment liquid is applied like the image. In this case, the drying time can be shortened and the required heating energy can be reduced.

Furthermore, there is also a mode in which the aggregating treatment liquid is applied by means of an application apparatus such as a roller, rather than an inkjet head. This allows the treatment liquid to be applied in a thinner layer than when using an inkjet head, and in this case also, the drying time can be shortened and the required heating energy can be reduced.

Having passed through the aggregating treatment liquid application unit, the base material is dried at a downstream stage by a heating unit (more specifically, it is dried for one second by a transfer drum at 60° C. and a hot air flow at 70° C.), thereby forming a solid or semi-solid layer of aggregating treatment agent on the base material. Next, droplets of the CMYK inks are ejected from the heads in accordance with an image signal. Recording is carried out at an ink ejection volume of 2 pl and a recording density of 1200 dpi in both the main scanning direction and the sub-scanning direction. Next, the base material is dried in a heating section (more specifically, dried for two seconds by a transfer drum at 25° C. and a hot air flow at 70° C., then dried for one second by a pressure drum at 50° C. and a hot air flow at 70° C., and then dried for two seconds by a pressure drum at 60° C. and a hot air flow at 70° C.).

Thereupon, the base material on which the image has been formed is heated and fixed by a pressure drum at 60° C., and a roller at a temperature of 110° C. and a nip pressure of 1 MPa. Desirably, a polymer resin (in the form of micro-particles) is included in the undercoating liquid or ink, and the heating temperature is set in accordance with the melting temperature of the polymer resin.

In the present embodiment, U-Lite (a matt coated paper) is described as an example, but various other types of media can be used according to need.

Evaluation Test of Landing Interference

Image formation was carried out using the image forming apparatus illustrated in FIG. 1, under the system conditions illustrated in FIG. 1 (hereinafter, called system conditions A), under the system conditions using the image forming apparatus in FIG. 1 from which the aggregating treatment liquid drying unit 138 was removed (hereinafter, called system conditions B), and under the system conditions using the image forming apparatus in FIG. 1 from which the aggregating treatment liquid application unit and the aggregating treatment liquid drying unit were removed (hereinafter, called system conditions C).

Preparation of Aggregating Treatment Agent

An aggregating treatment agent was prepared by mixing materials according to the following composition.

| Glycerine | 15% |
| Malonic acid | 10% |
| Surfactant 1 (Chemical Formula 7 below) | 1% |
| Deionized water | 74% |

Chemical Formula 7

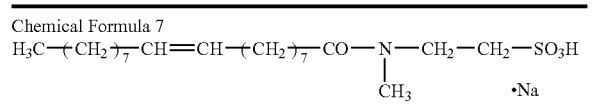

When the pH of the treatment liquid prepared in this way was measured with a pH meter, WM-50EG manufactured by DKK-TOA CORPORATION, the pH was found to be 3.5.

Preparation of Ink

Preparation of Polymer Dispersant P-1

88 g of methylethyl ketone was introduced into a 1000 ml three-mouthed flask fitted with an agitator and a cooling tube, and was heated to 72° C. in a nitrogen atmosphere, whereupon a solution formed by dissolving 0.85 g of dimethyl 2,2'-azobis isobutylate, 60 g of benzyl methacrylate, 10 g of methacrylic acid and 30 g of methyl methacrylate in 50 g of methylethyl ketone 50 g was added to the flask by titration over 3 hours. When titration had been completed and after reacting for a further hour, a solution of 0.42 g of dimethyl 2,2'-asobis isobutylate dissolved in 2 g of methylethyl ketone was added, the temperature was raised to 78° C. and the mixture was heated for 4 hours. The reaction solution thus obtained was suspended twice in an excess amount of hexane, and the precipitated resin was dried, yielding 96 g of a polymer dispersant P-1. The composition of the resin thus obtained was confirmed using a 1H-NMR, and the weight-average molecular weight (Mw) determined by GPC was 44600. Moreover, the acid number of the polymer was 65.2 mg KOH/g as determined by the method described in JIS (Japanese Industrial Standards) specifications (JISK 0070: 1992).

Preparation of Cyan Dispersion Liquid 10 parts of Pigment Blue 15:3 (phthalocyanine blue A220 made by Dainichi Seika Color & Chemicals Mfg. Co., Ltd.), 5 parts of the polymer dispersant P-1 obtained as described above, 42 parts of methylethyl ketone, 5.5 parts of an aqueous 1 mol/L NaOH solution, and 87.2 parts of deionized water were mixed together, and dispersed for 2 to 6 hours using 0.1 mm diameter zirconia beads in a beads mill. The methylethyl ketone was removed from the obtained dispersion at 55° C. under reduced pressure, and moreover a portion of the water was removed, thus obtaining a cyan dispersion liquid having a pigment density of 10.2 percent by mass. The cyan dispersion liquid forming a coloring material was prepared as described above. Using the coloring material (cyan dispersion liquid) obtained as described above, an ink 1 (inkjet recording liquid) was manufactured by combining the respective components so as to achieve the ink composition described below.

Ink Composition

| Cyan pigment (Pigment Blue 15:3) | 4% |
| Polymer dispersant (P-1 described above) | 2% |
| Glycerine | 15% |
| Olefin E1010 (a surfactant, made by Nisshin Chemical Industry Co., Ltd.) | 1% |
| Deionized water | 78% |

Having passed through the aggregating treatment liquid application unit, a base material was dried at a downstream stage by a heating unit (more specifically, it was dried for one second by a transfer roller at 60° C. and a hot air flow at 70° C.), thereby forming a solid or semi-solid layer of aggregating treatment agent on the base material. Next, droplets of the CMYK inks were ejected from the heads in accordance with an image signal. Recording was carried out at an ink ejection volume of 2 pl and a recording density of 1200 dpi in both the main scanning direction and the sub-scanning direction. Next, the base material was dried in a heating section (more specifically, dried for two seconds by a transfer drum at 25° C. and a hot air flow at 70° C., then dried for one second by a pressure drum at 50° C. and a hot air flow at 70° C., and then dried for two seconds by a pressure drum at 60° C. and a hot air flow at 70° C.).

Here, an experiment was carried out by changing the high-boiling-point organic solvent (HBS) in the ink and the aggregating treatment liquid to the high-boiling-point organic solvents shown in Table 2 in FIG. 3.

Please note that GP-250 means a trioxypropylene glyceryl ether, Sannix GP250, made by Sanyo Chemical Industries, Ltd.

The corresponding results are shown in Table 2. The evaluations in the table were made on the basis of the following criteria.

Landing Interference

◯: variation in line thickness when line is drawn—5 μm or less

Δ: variation in line thickness when line is drawn—more than 5 μm and less than 10 μm x: variation in line thickness when line is drawn—10 μm or more Movement of Coloring Material ○: no float of coloring material Δ: isolated dots x: isolated dots moved from depositing positions Contraction of Image ○: Image contraction—1% or less Δ: Image contraction—more than 1% and less than 5% x: Image contraction—5% or more

Dot White Spot Reproducibility

○: 1 dot white spot can be reproduced

Δ: 2 dot×2 dot white spots can be reproduced, but 1 dot white spot cannot be reproduced x: 2 dot×2 dot white spots cannot be reproduced Curl A sample printed at a rate of 250% was cut to 5×50 mm in such a manner that the longer edges traced an arc, and the curvature C of the sample was measured as described below. Curl was evaluated on the basis of the following evaluation criteria.

Method of Measuring Curvature

The curvature C of a sample onto which inkjet recording liquid had been applied was measured in an environment of a temperature of 25° C. and a relative humidity of 50%. The curl value C is expressed as an arc of a circle of radius R, as indicated in Expression 1 below.

$$C = 1/R(m) \qquad \text{Expression 1}$$

Evaluation Criteria

○: curvature C of sample did not exceed 20 one day after application.

Δ: curvature C of sample did not exceed 20 seven days after application.

x: curvature C of sample exceeded 20 seven days after application.

As the results shown in Table 2 in FIG. 3, good results in terms of all of the evaluation items were obtained only in the case of Level 6 which used an aggregating treatment liquid and an ink having water-soluble high-boiling-point organic solvent with an SP value of 30 or lower.

Dependence on Drying Conditions: Evaluation Experiment

Under the system conditions A, the temperature during drying and the conveyance speed were varied so as to achieve the residual water contents indicated below. The residual water content was investigated by measuring the weight immediately after drying. A list of conditions is shown in Table 3 in FIG. 4.

An evaluation test for landing interference and other factors, was carried out under the conditions shown in Table 4 in FIG. 5. A summary of the results are shown in Table 4.

As indicated by the results shown in Table 4, good results were obtained in respect of all of the evaluation items in the case of Level 7 and Level 8, in cases where drying was carried out within 5 seconds of depositing the aggregating treatment liquid, and the water contained in the solvent of the ink on the recording medium was removed to a level of 4 g/m² or lower when converted to a deposition volume.

Moreover, under the condition A, a mode using a solvent absorbing roller rather than drying was also investigated (condition L). Table 5 and Table 6 in FIGS. 6 and 7 indicate the conditions and the corresponding results.

As indicated by the results shown in Table 6, good results were obtained in respect of all of the evaluation items by carrying out drying within 5 seconds of depositing the aggregating treatment liquid so as to remove the water contained in the solvent of the ink on the recording medium to a level of 4 g/m² or lower when converted to a deposition volume.

Comparison of High-boiling-point Solvents Evaluation Experiment

An experiment was carried out by changing the high-boiling-point organic solvents (HBS) in the ink and the aggregating treatment liquid to the high-boiling-point organic solvents indicated by A to G below.

A: diethylene glycol (30.62)

B: 1,2 hexane diol (27.4)

C: dipropylene glycol (27.2)

D: tripropylene glycol (24.7)

E: diethylene glycol monoethyl ether (22.4)

F: triethylene glycol monobutyl ether (21.1)

G: $nC_4H_9O(AO)_{10}H$ (AO=EO or PO, ratio: 1:1) (18.8)

GP-250: trioxy propylene glyceryl ether (26.4)

The conditions and corresponding results are shown in Table 7 in FIG. 8.

Furthermore, experimentation was also carried out in cases where the high-boiling-point solvent of the ink was different from the high-boiling-point solvent in the treatment liquid. The conditions and corresponding results are shown in Table 8 in FIG. 9.

Moreover, investigation was also made into cases where the content of high-boiling-point solvent in the ink and the content of high-boiling-point solvent in the treatment liquid were changed. More specifically, in respect of the manufacturing methods stated above for the preparation of the aggregating treatment agent and the preparation of the ink, the density of pigment in the ink was set to 1% and the density of malonic acid in the treatment liquid was set to 2%. The conditions and corresponding results are shown in Table 9 in FIG. 10. Furthermore, the lightfastness was also evaluated.

Lightfastness

A sample printed at a print rate of 100% was illuminated continuously for 20 days with a xenon lamp at 99,000 lux.

○: 70% or more density remaining

Δ: less than 70% and more than 60% density remaining x: 60% or less density remaining As the results in Tables 7 to 9 reveal, good results for all of the evaluation items were obtained by means of the image forming method in relation to an embodiment of the present invention which comprises: a step of depositing onto a recording medium an aggregating treatment liquid containing 10% or more and 90% or less of a water-soluble high-boiling-point organic solvent having an SP value of 30 or lower; a step of drying the treatment liquid deposited on the recording medium within five seconds after the step of depositing same; a step of ejecting droplets of ink containing 10% or more and 90% or less of water-soluble high-boiling-point organic solvent having an SP value of 30 or lower, in accordance with an image signal, so as to be superimposed on the aggregating treatment liquid that has been deposited on the recording medium; and a step of removing the water contained in the solvent of the ink on the recording medium, to a level of 4 g/m² or lower when converted to a deposition volume.

Furthermore, as the results in Table 9 reveal, by using an aggregating treatment liquid and an ink containing 10% or more and 90% or less of a water-soluble high-boiling-point organic solvent having an SP value of 30 of lower, satisfactory or good results (○ or Δ) are obtained for all evaluation items (levels 35 to 40), but by using an aggregating treatment liquid and an ink containing 10% or more and 30% or less of a water-soluble high-boiling-point organic solvent having an SP value of 30 or less, good results (o) are obtained for all evaluation items (levels 38 to 40).

Moreover, a similar experiment to Level 6 in Table 2 was carried out with the exception that system conditions (system conditions M) were adopted in which the heating and fixing portion was removed from the system conditions A. Furthermore, a 20% halftone sample was created using Tokubishi art paper as the base material. The experimental results are shown in Table 10 in FIG. 11.

The gloss was measured using an IG-331 handheld gloss checker (manufactured by HORIBA, Ltd).

Gloss
○: 50 or above
Δ: 30 to 40
x : 30 or lower

The gloss at high halftone % was "○" in both cases. From Table 10 in FIG. 11, it can be seen that gloss only declines at low halftone % due to the fact that fixing is not carried out.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming method, comprising the steps of:
   depositing an aggregating treatment liquid containing an aggregating agent onto a recording medium, the aggregating agent containing 10% or more and 90% or less of a water-soluble high-boiling-point organic solvent having a Solubility Parameter (SP) value of 30 or lower $(MPa)^{1/2}$ measured at 25° C. and being configured to aggregate a latex and/or a pigment;
   starting drying of the aggregating treatment liquid deposited on the recording medium within five seconds after the step of depositing the aggregating treatment liquid onto the recording medium;
   ejecting an ink containing 10% or more and 90% or less of a water-soluble high-boiling-point organic solvent having a Solubility Parameter (SP) value of 30 or lower $(MPa)^{1/2}$ measured at 25° C. and the latex and/or the pigment in accordance with an image signal, so as to be superimposed on the aggregating treatment liquid deposited on the recording medium; and
   removing water contained in the solvent of the ink on the recording medium in such a manner that the water contained in the ink becomes 4 $g/m^2$ or less when converted to a deposition volume.

2. The image forming method as defined in claim 1, wherein the aggregating treatment liquid and the ink each contain 10% or more and 30% or less of the water-soluble high-boiling-point organic solvent having a Solubility Parameter (SP) value of 30 or lower $(MPa)^{1/2}$ measured at 25° C.

3. The image forming method as defined in claim 1, comprising the step of fixing the ink on the recording medium after the step of removing the water contained in the solvent of the ink on the recording medium.

4. The image forming method as defined in claim 1, wherein the recording medium is a coated paper.

5. The image forming method as defined in claim 3, wherein in the step of fixing the ink on the recording medium, the ink on the recording medium is fixed by thermal pressurizing fixing.

6. An image forming apparatus, comprising:
   an aggregating treatment liquid deposition device which deposits an aggregating treatment liquid containing an aggregating agent onto a recording medium, the aggregating agent containing 10% or more and 90% or less of a water-soluble high-boiling-point organic solvent having a Solubility Parameter (SP) value of 30 or lower $(MPa)^{1/2}$ measured at 25° C. and being configured to aggregate a latex and/or a pigment;
   an aggregating treatment liquid drying device which dries the aggregating treatment liquid deposited on the recording medium within five seconds after the aggregating treatment liquid is deposited onto the recording medium;
   an ink droplet ejection device which ejects an ink containing 10% or more and 90% or less of a water-soluble high-boiling-point organic solvent having a Solubility Parameter (SP) value of 30 or lower $(MPa)^{1/2}$ measured at 25° C. and the latex and/or the pigment in accordance with an image signal in such a manner that the ink is superimposed on the aggregating treatment liquid deposited on the recording medium; and
   a water removing device which removes water contained in the solvent of the ink on the recording medium in such a manner that the water contained in the ink becomes 4 $g/m^2$ or less when converted to a deposition volume.

7. The image forming apparatus as defined in claim 6, comprising an image fixing device which fixes, onto the recording medium, the ink from which the water has been removed in such a manner that the water contained in the ink becomes 4 $g/m^2$ or less when converted to a deposition volume.

\* \* \* \* \*